United States Patent
Lee et al.

(10) Patent No.: US 7,889,305 B2
(45) Date of Patent: Feb. 15, 2011

(54) LIQUID CRYSTAL DISPLAY DEVICE AND METHOD OF DRIVING THEREOF

(75) Inventors: Seong-young Lee, Anyang-si (KR); Young-goo Song, Cheonan-si (KR); Yun-jung Cho, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/817,644

(22) Filed: Jun. 17, 2010

(65) Prior Publication Data
US 2010/0253899 A1    Oct. 7, 2010

Related U.S. Application Data

(63) Continuation of application No. 12/042,616, filed on Mar. 5, 2008, now Pat. No. 7,746,438.

(30) Foreign Application Priority Data
Mar. 13, 2007    (KR)    ..................... 10-2007-0024481

(51) Int. Cl.
G02F 1/1343    (2006.01)
(52) U.S. Cl. ...................................... 349/144; 349/143
(58) Field of Classification Search ................. 349/144, 349/41, 138, 139, 142, 143, 149; 345/87
See application file for complete search history.

(56) References Cited

U.S. PATENT DOCUMENTS

| | | | |
|---|---|---|---|
| 7,079,214 B2 | 7/2006 | Shimoshikiryo | 349/144 |
| 7,593,078 B2 | 9/2009 | Ochiai et al. | 349/114 |
| 7,746,438 B2 * | 6/2010 | Lee et al. | 349/144 |
| 2003/0227591 A1 | 12/2003 | Liu et al. | 349/143 |
| 2004/0036815 A1 | 2/2004 | Kim et al. | 349/38 |
| 2004/0233368 A1 | 11/2004 | Kim et al. | 349/139 |
| 2006/0164352 A1 | 7/2006 | Yoo et al. | 345/87 |
| 2006/0227274 A1 | 10/2006 | Do et al. | 349/139 |
| 2007/0109238 A1 * | 5/2007 | Lee et al. | 345/87 |
| 2008/0013022 A1 | 1/2008 | Ochiai et al. | 349/114 |
| 2008/0225218 A1 | 9/2008 | Lee et al. | 349/144 |

FOREIGN PATENT DOCUMENTS

KR    1020060018401    3/2006

OTHER PUBLICATIONS

European Search Report for application No. 08004001.7-2205 dated May 26, 2008.

* cited by examiner

*Primary Examiner*—Brian M Healy
(74) *Attorney, Agent, or Firm*—Cantor Colburn LLP

(57) ABSTRACT

The liquid crystal display device includes a first insulation substrate, a gate line which is disposed on the first insulation substrate and extends substantially in a first direction, first and second data lines which are insulated from the gate line, extend substantially in a second direction and intersect the gate line, a pixel electrode which includes first and second sub-pixel electrodes which are each provided with different data voltages via the first and second data lines, respectively, and which are separated from each other by a gap, the second sub-pixel electrode at least partially overlapping the first and second data lines, a second insulation substrate which faces the first insulation substrate, a black matrix which is disposed on the second insulation substrate and includes an irregular shape and extends substantially along the first and second data lines and a liquid crystal layer which is interposed between the first and second insulation substrates.

20 Claims, 9 Drawing Sheets

LIQUID CRYSTAL DISPLAY DEVICE AND METHOD OF DRIVING THEREOF

CROSS REFERENCE TO RELATED APPLICATIONS

This application is a continuation of U.S. patent application Ser. No. 12/042,616, filed on Mar. 5, 2008, which claims priority to Korean Patent Application No. 10-2007-0024481, filed on Mar. 13, 2007, and all the benefits accruing therefrom under 35 U.S.C. §119, the contents of which in its entirety are herein incorporated by reference.

BACKGROUND OF THE INVENTION

1. Field of the Invention

The present invention relates to a display device, and more particularly, to a liquid crystal display ("LCD") device and a method of driving thereof which can enhance a quality of display images.

2. Description of the Related Art

LCD devices, which are one of the most widely used flat panel display devices, are comprised of two display panels on which a plurality of electric field generation electrodes, such as pixel electrodes and common electrodes, are formed. A liquid crystal layer is interposed between the two display panels. LCD devices generate an image by applying a voltage to the electric field generation electrodes in order to generate an electric field, altering an alignment of liquid crystal molecules in the liquid crystal layer using the electric field and controlling a polarization of incident light.

Particularly, public attention has been drawn to vertical alignment mode LCD devices, which are a type of LCD device which includes liquid crystal molecules aligned perpendicular to upper and lower display panels when no electric field is applied, since vertical alignment mode LCD devices can provide high contrast ratios and can also facilitate the realization of wide viewing angles. Vertical alignment mode LCD devices, however, have a poor lateral visibility as compared to a frontal visibility. Therefore, in order to address this disadvantage, a method that involves dividing each pixel into a pair of sub-pixels, installing a switching device in each of the sub-pixels and applying different voltages to the sub-pixel electrodes has been previously suggested.

In the case of conventional LCD devices, a movement of liquid crystal molecules which are located above data lines may not be able to be precisely controlled in accordance with an electric field generated by a pixel electrode, which thereby causes light leakage and deterioration of display characteristics.

In addition, in the case of conventional LCD devices, a mismatch between a coupling capacitance between a sub-pixel electrode to which a relatively high data voltage is applied and one data line of a pair of data lines that are disposed on opposite sides of the sub-pixel electrode and the coupling capacitance between the sub-pixel electrode and the other data line of the pair of data lines may deteriorate display characteristics. Therefore, it is necessary to reduce the coupling capacitances between a sub-pixel electrode and a pair of data lines adjacent to the sub-pixel electrode.

BRIEF SUMMARY OF THE INVENTION

The present invention provides a liquid crystal display ("LCD") device which can enhance the quality of display of images.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

According to an exemplary embodiment of the present invention, an LCD device includes a first insulation substrate, a gate line which is disposed on the first insulation substrate and extends substantially in a first direction, first and second data lines which are insulated from the gate line, extend substantially in a second direction and intersect the gate line, a pixel electrode which includes first and second sub-pixel electrodes which are each provided with different data voltages via the first and second data lines, respectively, and which are separated from each other by a gap, the second sub-pixel electrode at least partially overlapping the first and second data lines, a second insulation substrate which faces the first insulation substrate, a black matrix which is disposed on the second insulation substrate, includes an irregular shape and extends substantially along the first and second data lines and a liquid crystal layer which is interposed between the first and second insulation substrates.

According to an exemplary embodiment of the present invention, a method of driving a liquid crystal display device which includes a first insulation substrate, a gate line which is disposed on the first insulation substrate and extends substantially in a first direction, first and second data lines which are insulated from the gate line, extend substantially in a second direction and intersect the gate line, a pixel electrode which includes first and second sub-pixel electrodes which are separated from each other by a gap, the second sub-pixel electrode at least partially overlapping the first and second data lines, a second insulation substrate which faces the first insulation substrate, a black matrix which is disposed on the second insulation substrate, includes an irregular shape and extends substantially along the first and second data lines and a liquid crystal layer which is interposed between the first and second insulation substrates, the method includes providing different data voltages via the first and second data lines to the first and second sub-pixel electrodes, respectively; and applying a larger data voltage to the first sub-pixel than to the second sub-pixel.

BRIEF DESCRIPTION OF THE DRAWINGS

The above and other aspects, features and advantages of the present invention will become more apparent by describing in detail exemplary embodiments thereof with reference to the attached drawings, in which.

DETAILED DESCRIPTION OF THE INVENTION

The present invention will now be described more fully hereinafter with reference to the accompanying drawings, in which exemplary embodiments of the present invention are illustrated. The present invention may, however, be embodied in different forms and should not be construed as limited to the exemplary embodiments set forth herein. Rather, these exemplary embodiments are provided so that this disclosure will be thorough and complete, and will fully convey the scope of the present invention to those skilled in the art.

In the figures, the dimensions of layers and regions may be exaggerated for clarity of illustration. It will also be understood that when a layer or element is referred to as being "on," "connected to" or "coupled to" another layer or element, it can be directly on, connected or coupled to the other layer or element, or intervening elements or layers may also be present. In contrast, when an element is referred to as being "directly on" another element, there are no intervening elements or layers present. As used herein, the term "and/or" includes any and all combinations of one or more of the associated listed items. Further, it will be understood that when a layer is referred to as being "under" another layer or element, it can be directly under, and one or more intervening layers or elements may also be present. In addition, it will also be understood that when a layer or element is referred to as being "between" two layers or elements, it can be the only layer between the two layers or elements, or one or more intervening layers or elements may also be present. Like reference numerals refer to like elements throughout.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. In addition, the regions illustrated in the figures are schematic in nature and their shapes are not intended to illustrate the actual shape of a region of a device and are not intended to limit the scope of the invention.

An exemplary embodiment of a liquid crystal display ("LCD") according to the present invention will hereinafter be described in more detail with reference to the accompanying drawings.

Figure 1:
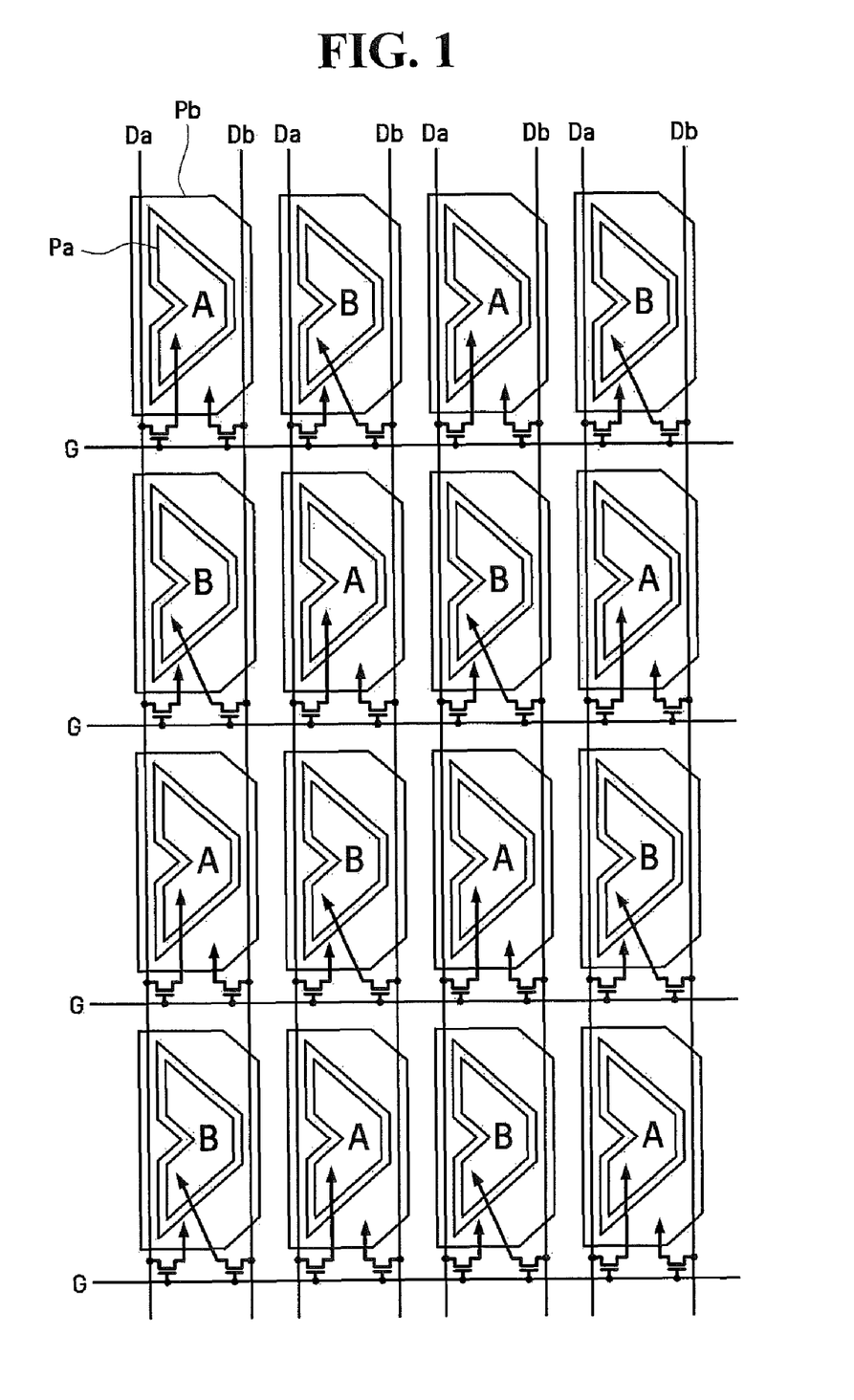
FIG. 1 illustrates an exemplary pixel array of an exemplary embodiment of a liquid crystal display ("LCD") device according to the present invention.
Figure 2:
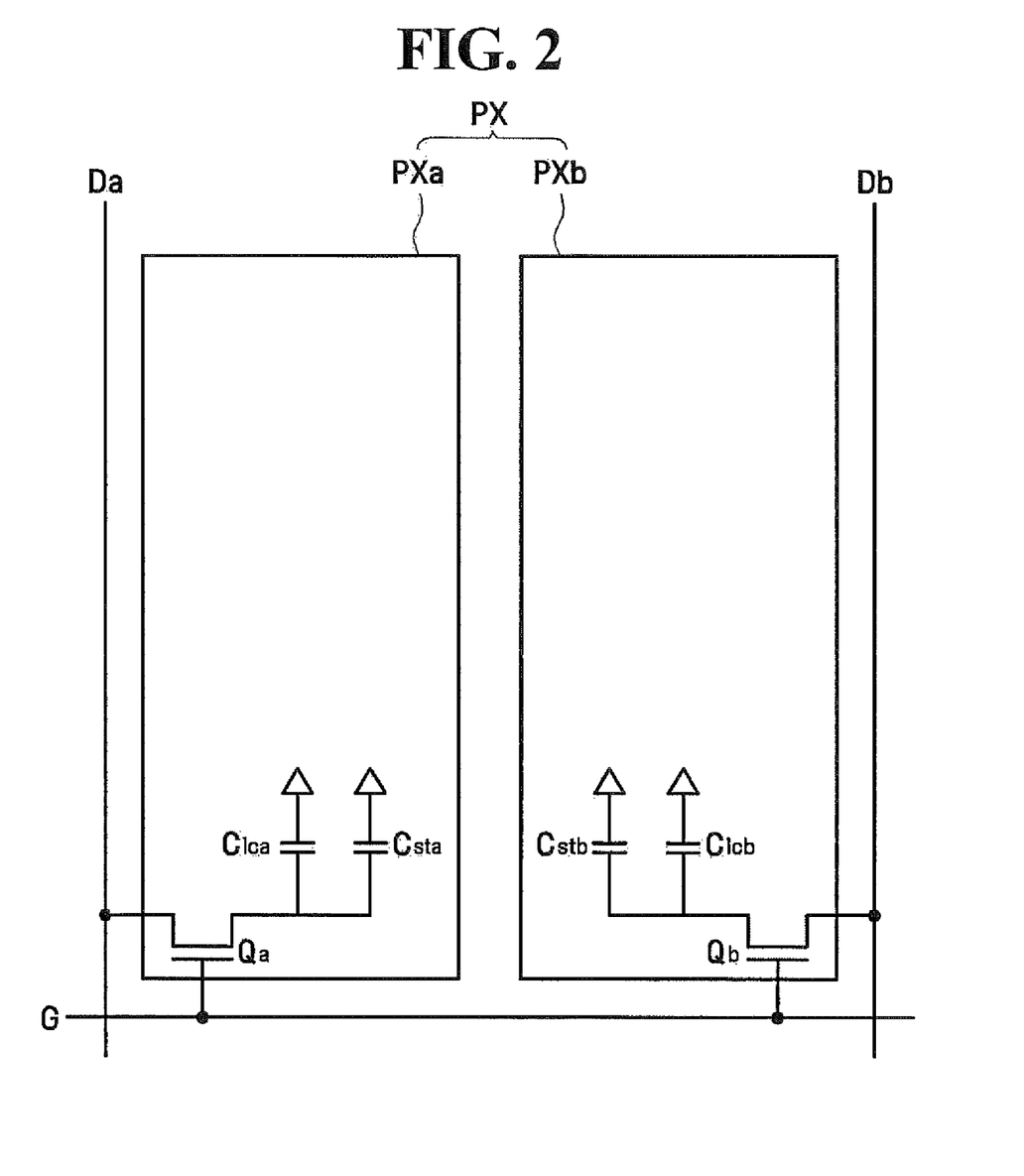
FIG. 2 illustrates an equivalent circuit schematic diagram of an exemplary pixel of the exemplary LCD device illustrated in FIG. 1.

FIG. 1 illustrates an exemplary pixel array of an exemplary embodiment of an LCD device according to the present invention, and FIG. 2 is an equivalent circuit schematic diagram of an exemplary pixel of the exemplary LCD device illustrated in FIG. 1.

Referring to FIG. 1, the exemplary LCD device includes a liquid crystal panel assembly, a gate driving unit and a data driving unit which are connected to the liquid crystal panel assembly, a gray voltage generation unit which is connected to the data driving unit and a control unit which controls the liquid crystal panel assembly, the gate driving unit, the data driving unit and the gray voltage generation unit.

The liquid crystal panel assembly includes a plurality of pixels which are connected to a plurality of display signal lines and are arranged in a matrix. The liquid crystal panel assembly also includes a lower display panel and an upper display panel which face each other, and a liquid crystal layer which is interposed between the lower display panel and the upper display panel.

Referring to FIGS. 1 and 2, a plurality of display signal lines are disposed on a lower display panel. Exemplary embodiments of the display signal lines include a plurality of gate lines G and a plurality of data lines Da and Db. The gate lines G extend substantially in a first direction, such as a row direction and are substantially in parallel with one another. The data lines Da and Db extend substantially in a second direction, such as a column direction and are substantially in parallel with each other.

Referring to FIG. 2, a pixel PX includes a pair of sub-pixels PXa and PXb. The sub-pixels PXa and PXb include switching devices $Q_a$ and $Q_b$, respectively, liquid crystal capacitors $C_{lca}$ and $C_{lcb}$, respectively, and storage capacitors $C_{sta}$ and $C_{stb}$, respectively. The switching devices $Q_a$ and $Q_b$ are respectively connected to data lines Da and Db, and both switching devices $Q_a$ and $Q_b$ are connected to a same gate line G. The liquid crystal capacitors $C_{lca}$ and $C_{lcb}$ are respectively connected to the switching devices $Q_a$ and $Q_b$. The storage capacitors $C_{sta}$ and $C_{stb}$ are respectively connected to the switching devices $Q_a$ and $Q_b$. In short, the sub-pixels PXa and PXb are provided with two data lines Da and Db and one gate line G. The storage capacitors $C_{sta}$ and $C_{stb}$ are included in exemplary embodiments.

Each of the switching devices $Q_a$ and $Q_b$ is comprised of a thin film transistor ("TFT") which is mounted on a lower display panel. More specifically, the switching devices $Q_a$ and $Q_b$ are 3-terminal devices including a control terminal (hereinafter referred to as a gate electrode) which is connected to the gate line G, an input terminal (hereinafter referred to as a source electrode) which is connected to the data line Da or Db and an output terminal (hereinafter referred to as a drain electrode) which is connected to the storage capacitor $C_{sta}$ or $C_{stb}$.

The liquid crystal capacitor $C_{lca}$ includes two terminals a sub-pixel electrode Pa which is disposed on the lower display panel and a common electrode which is disposed on an upper display panel. Likewise, the liquid crystal capacitor $C_{lcb}$ includes two terminals, a sub-pixel electrode Pb which is disposed on the lower display panel and the common electrode which is disposed on the upper display panel. A liquid crystal layer, which is disposed between the sub-pixel electrodes Pa and Pb and the common electrode, serves as a dielectric material. The sub-pixel electrodes Pa and Pb are respectively connected to the switching devices $Q_a$ and $Q_b$. A common voltage Vcom is applied to the common electrode which is disposed on the upper display panel. In exemplary embodiments, the common electrode may be disposed on the lower display panel. In this case, at least one of the sub-pixel electrodes Pa and Pb and the common electrode may be formed as a stripe or a bar shape.

The storage capacitors $C_{sta}$ and $C_{stb}$, which serve as auxiliary capacitors for the liquid crystal capacitors $C_{lca}$ and $C_{lcb}$, are formed by laying the sub-pixel electrodes Pa and Pb over storage interconnections which are disposed on the lower display panel with a dielectric material interposed between the sub-pixel electrodes Pa and Pb and the storage interconnections. In exemplary embodiments, a predefined voltage such as the common voltage Vcom may be applied to the storage interconnections. In alternative exemplary embodiments, the storage capacitors $C_{sta}$ and $C_{stb}$ may be formed by laying the sub-pixel electrodes over a previous gate line with a dielectric material interposed between the sub-pixel electrodes and the previous gate line.

In exemplary embodiments, in order to implement a color display, each pixel uniquely represents one color of a plurality of primary colors (space division, i.e., spatial division) or in alternative exemplary embodiments, each pixel represents all the primary colors over a period of time (time division, i.e., temporal sum), thereby realizing a desired color by the spatial or temporal sum of the primary colors. Exemplary embodiments of the primary colors include red, green and blue. In order to implement space division, each pixel may be designed to include a color filter which represents one of the primary colors and which is disposed in a region of an upper display panel, in an exemplary embodiment. In an alternative exemplary embodiment, the color filter may be disposed above or below a pixel electrode of a lower display panel.

The gate driving unit is connected to a gate line G. The gate driving unit generates a gate signal which is comprised of a combination of a gate-on voltage Von and a gate-off voltage Voff which are received from an external source (not shown), and applies the gate signal to the gate line G.

The gray voltage generation unit generates two gray voltage sets (or a reference gray voltage set) which are related to a transmissivity of pixels and provides the two gray voltage sets to the data driving unit. That is, in exemplary embodiments, the two gray voltage sets may be respectively provided to a pair of sub-pixels of a pixel. However, the present invention is not restricted to this. That is, in exemplary embodiments, the gray voltage generation unit may generate only one gray voltage set, instead of generating two gray voltage sets.

The data driving unit is connected to a pair of data lines Da and Db. The data driving unit transmits a first data voltage to one sub-pixel of a pair of sub-pixels within a pixel via the data line Da and transmits a second data voltage to the other sub-pixel of the pair of sub-pixels within the pixel via the data line Db.

In exemplary embodiments, the gate driving unit or the data driving unit may be directly mounted on the liquid crystal panel assembly as an integrated driving circuit chip or may be attached onto the liquid crystal panel assembly as a tape carrier package ("TCP") by being mounted on a flexible printed circuit ("FPC") film. In alternative exemplary embodiments, the gate driving unit or the data driving unit may be integrated into the liquid crystal panel assembly along with the display signal lines G, Da and Db and the switching devices $Q_a$ and $Q_b$ of each pixel.

The signal control unit controls operations of the gate driving unit, the data driving unit, the gray voltage generation unit and etc.

Referring now to FIGS. 1 and 2, each pixel PX includes two switching devices Qa and Qb and a pair of first and second sub-pixel electrodes Pa and Pb, which are respectively connected to the switching devices Qa and Qb. A relatively high data voltage is applied to each of the first sub-pixel electrodes Pa, and a relatively low data voltage is applied to each of the second sub-pixel electrodes Pb. Here, it is determined whether a data voltage is high or low by comparing the data voltage with a common voltage Vcom. A pixel PX including a first sub-pixel electrode Pa to which a data voltage is applied via the first data line Da is referred to as an A-type pixel, and a pixel PX including a first sub-pixel electrode Pa to which a data voltage is applied via the second data line Db is referred to as a B-type pixel.

Referring to FIG. 1, an A-type pixel and a B-type pixel are alternately arranged in each row and in each column, thereby preventing or substantially reducing vertical or horizontal stripes from appearing visible on the screen of an LCD device.

If the first sub-pixel electrodes Pa of all pixels PX in a pixel array are provided with a data voltage via the first data line Da, e.g., if all the pixels PX in the pixel array are A-type pixels, then vertical stripes which are shifted in a horizontal direction may be detected on the screen of an LCD device with the aid of an inspection pattern which is shifted by one pixel at a time for each frame in the horizontal direction, when the LCD device is driven using a column inversion method.

The problem of such vertical stripes may be addressed by applying a data voltage to the first sub-pixel electrodes Pa of a first row of pixels via the first data line Da and applying a data voltage to the first sub-pixel electrodes Pa of a second row of pixels via the second data line Db, e.g., by alternately arranging a row of A-type pixels and a row of B-type pixels. However, when coupling occurs between a first sub-pixel electrode Pa of a pixel and the first and second data lines Da and Db, horizontal stripes may appear visible on the screen of an LCD device depending on whether the pixel is an A-type pixel or a B-type pixel, since the coupling capacitances between a first sub-pixel electrode Pa and the first and second data lines Da and Db vary according to whether a pixel of the first sub-pixel electrode Pa is of an A-type pixel or a B-type pixel.

Therefore, referring to FIG. 1, an A-type pixel and a B-type pixel are alternately arranged in a horizontal direction and a vertical direction, respectively, thereby preventing vertical or horizontal stripes from appearing visible on the screen of an LCD device. In the case of driving an LCD device at a low grayscale level, liquid crystal molecules are substantially driven only by a first sub-pixel electrode Pa to which a relatively high data voltage is applied. Thus, a quality of display of images can be prevented or substantially reduced from deteriorating due to crosstalk by reducing a difference between the coupling capacitances between a first sub-pixel electrode Pa of each A-type pixel and the first and second data lines Da and Db and a difference between the coupling capacitances between a first sub-pixel electrode Pa of each B-type pixel and the first and second data lines.

According to an exemplary embodiment of the present invention, the first and second data lines Da and Db may be overlapped by a second sub-pixel electrode Pb, and the second sub-pixel electrode Pb substantially surrounds a first sub-pixel electrode Pa, thereby preventing or substantially reducing vertical or horizontal stripes from appearing visible on the screen of an LCD device without the need to alternately arrange an A-type pixel and a B-type pixel in a pixel array. That is, it is possible to prevent or substantially reducing deterioration of the display characteristics of an LCD device by minimizing the coupling capacitances between a first sub-pixel electrode Pa and the first and second data lines Da and Db. This will be described in further detail below.

The structure of an LCD device according to an exemplary embodiment of the present invention will hereinafter be described in detail with reference to FIGS. 3A through 7B. An LCD device according to an exemplary embodiment of the present invention includes a lower display panel on which a TFT array is disposed, an upper display panel which faces the lower display panel and a liquid crystal layer which is interposed between the lower display panel and the upper display panel.

Figure 3A:
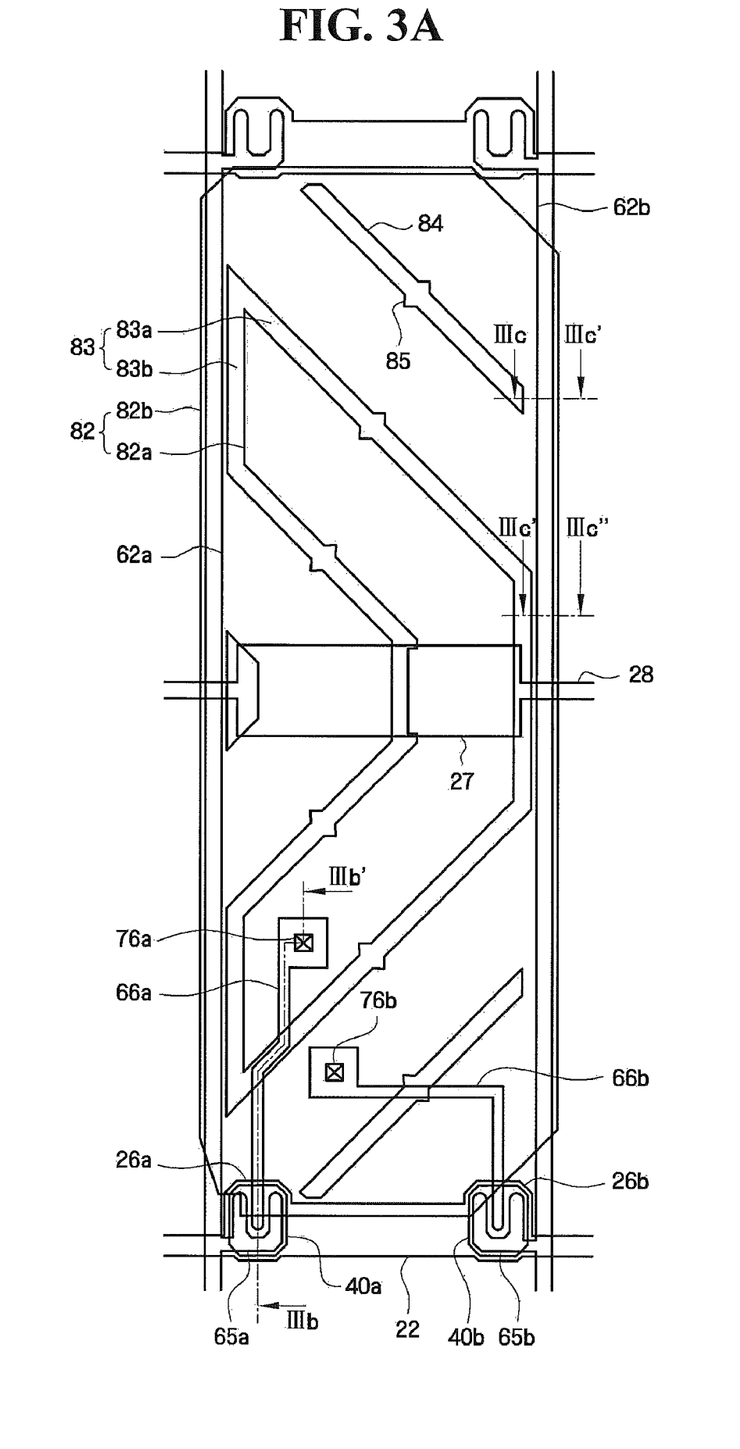
FIG. 3A illustrates a top plan layout view of an exemplary embodiment of a lower display panel including an A-type pixel of FIG. 1 according to the present invention.

The structure of a lower display panel of an LCD device according to an exemplary embodiment of the present invention will hereinafter be described in detail with reference to FIGS. 3A through 3C. FIG. 3A illustrates a top plan layout view of an exemplary embodiment of a lower display panel including an A-type pixel, FIG. 3B illustrates a cross-sectional schematic diagram view taken along line IIIb-IIIb' of FIG. 3A and FIG. 3C illustrates cross-sectional schematic diagram views respectively taken along lines IIIc-IIIc' and IIIc'-IIIc" of FIG. 3A.

Figure 3B:
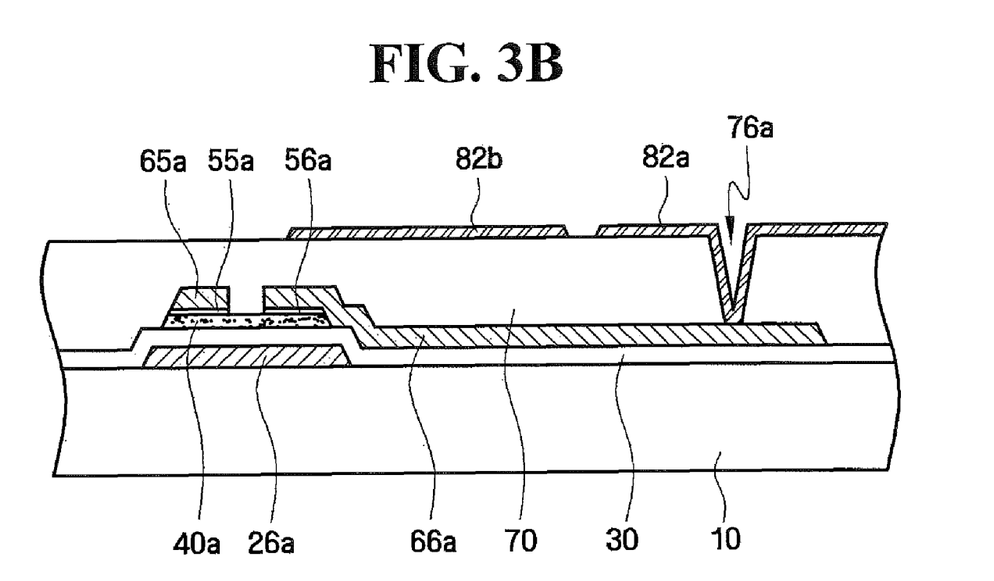
FIG. 3B illustrates a cross-sectional schematic diagram view taken along line IIIb-IIIb' of FIG. 3A.
Figure 3C:
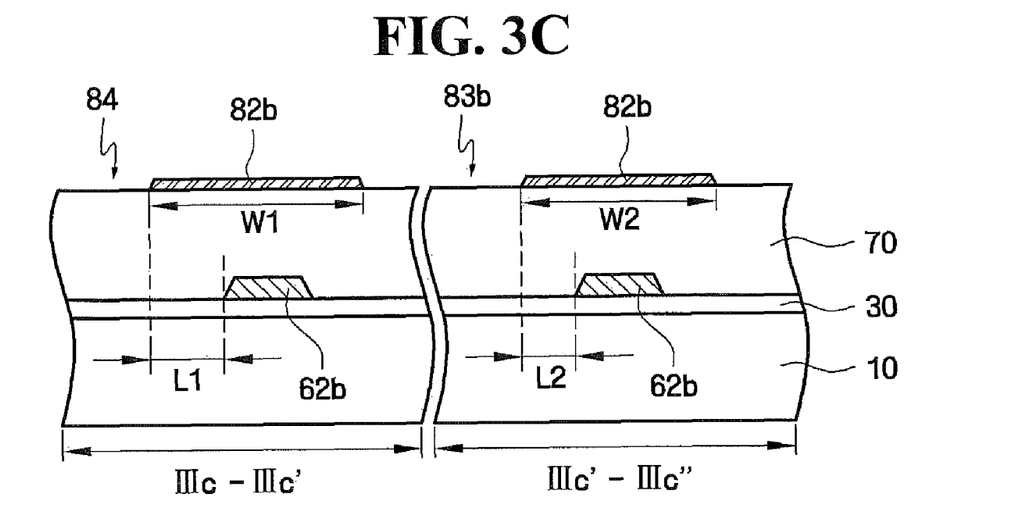
FIG. 3C illustrates a cross-sectional schematic diagram view taken along line IIIc-IIIc' of FIG. 3A and a cross-sectional schematic diagram view taken along line IIIc'-IIIc" of FIG. 3A.

Referring to FIGS. 3A through 3C, a gate line 22 is formed on an insulation substrate 10 which is formed of, for example, transparent glass, in an exemplary embodiment. The gate line 22 extends substantially in a horizontal direction and transmits a gate signal. One gate line 22 is allocated for each pixel PX. The gate line 22 includes a pair of first and second gate electrodes 26a and 26b which extend from a corresponding gate line 22. The gate line 22 and the first and second gate electrodes 26a and 26b are collectively referred to as gate interconnections.

A storage line 28 is formed on the insulation substrate 10 and extends across a pixel region along a horizontal direction, as illustrated in FIG. 3A. The storage line 28 is substantially in parallel with the gate lines 22. A storage electrode 27 is connected to the storage line 28 and is substantially wider than the storage line 28. The storage electrode 27 forms a storage capacitor, which enhances charge storage capabilities of a pixel, by laying a pixel electrode 82 over the storage electrode 27. The storage electrode 27 and the storage line 28 are collectively referred to as storage interconnections. The storage interconnections 27 and 28 extend across a central portion of a pixel region, however the present invention is not restricted to this. That is, in exemplary embodiments, a shape and an arrangement of the storage interconnections 27 and 28 may be altered in various manners. In exemplary embodiments, if storage capacitance generated by the pixel electrode 82 and the gate line 22, which overlap each other, is sufficiently large, the storage interconnections 27 and 28 may be omitted.

In exemplary embodiments, the gate interconnections 22, 26a and 26b and the storage interconnections 27 and 28 may be formed of aluminum (Al) or an aluminum-based metallic material such as an aluminum alloy, silver (Ag) or a silver-based metallic material such as a silver alloy, copper (Cu) or a copper-based metallic material such as a copper alloy, molybdenum (Mo) or a molybdenum-based metallic material such as a molybdenum alloy, chrome (Cr), titanium (Ti), or tantalum (Ta). In exemplary embodiments, the gate interconnections 22, 26a and 26b and the storage interconnections 27 and 28 may include a multi-layered structure including two conductive layers (not shown) having different physical properties. In an exemplary embodiment, one of the two conductive layers may be formed of a low-resistance metal, for example, aluminum or an aluminum-based metallic material, silver or a silver-based metallic material, or copper or a copper-based metallic material such that the possibility of a signal delay or a voltage drop can be reduced. In further exemplary embodiments, the other conductive layer may be formed of a material including excellent contact characteristics to, for example, indium tin oxide ("ITO") or indium zinc oxide ("IZO"), such as molybdenum or a molybdenum-based metallic material, chromium, titanium, or tantalum. In further exemplary embodiments, the gate interconnections 22, 26a and 26b and the storage interconnections 27 and 28 may be double layers including a chromium layer (as a lower layer) and an aluminum layer (as an upper layer) or including an aluminum layer (as a lower layer) and a molybdenum layer (as an upper layer). However, the present invention is not restricted to this. That is, in exemplary embodiments, the gate interconnections 22, 26a and 26b and the storage interconnections 27 and 28 may be formed of various metals and conductive materials other than those set forth herein.

A gate insulation layer 30 is formed of silicon nitride ("SiN$_x$") on the gate line 22 and on the storage interconnections 27 and 28.

In exemplary embodiments, a pair of semiconductor layers 40a and 40b are formed of hydrogenated amorphous silicon or polycrystalline silicon on the gate insulation layer 30. In further exemplary embodiments, the semiconductor layers 40a and 40b may be formed in various shapes. In an exemplary embodiment, for example, the semiconductor layers 40a and 40b may be formed as islands or lines.

A pair of ohmic contact layers 55a and 56a are formed of silicide or n+ hydrogenated amorphous silicon doped with a high concentration of n-type impurities on the semiconductor layers 40a and 40b, respectively.

A pair of first and second data lines 62a and 62b and a pair of first and second drain electrodes 66a and 66b are formed on the ohmic contact layers 55a and 56a and the gate insulation layer 30. The first and second data lines 62a and 62b respectively correspond to the first and second drain electrodes 66a and 66b.

Referring to FIG. 3A, the first and second data lines 62a and 62b extend substantially along a vertical direction, intersect the gate line 22 and the storage line 28 and transmit a data voltage. First and second source electrodes 65a and 65b respectively extend from the first and second data lines 62a and 62b toward the first and second drain electrodes 66a and 66b. Referring to FIG. 3A, a pixel PX is divided into a pair of sub-pixels. The first data line 62a transmits a data signal to one of the sub-pixels, and the second data line 62b transmits a data signal to the other sub-pixel.

The first and second data lines 62a and 62b, the first and second source electrodes 65a and 65b and the first and second drain electrodes 66a and 66b are collectively referred to as data interconnections.

In exemplary embodiments, the data interconnections 62a, 62b, 65a, 65b, 66a and 66b may be formed of a fire-resistant metal such as chromium, molybdenum or a molybdenum-based metallic material, tantalum, or titanium. In further exemplary embodiments, the data interconnections 62a, 62b, 65a, 65b, 66a and 66b may be comprised of a multi-layered structure including a lower layer (not shown) which is formed of a fire-resistant metal and an upper layer (not shown) which is formed of a low-resistance material. In exemplary embodiments, for example, the data interconnections 62a, 62b, 65a, 65b, 66a and 66b may be comprised of a double layer including a chromium layer (as a lower layer) and an aluminum layer (as an upper layer) or including an aluminum layer (as a lower layer) and a molybdenum layer (as an upper layer). In further exemplary embodiments, the data interconnections 62a, 62b, 65a, 65b, 66a and 66b may be comprised of a triple layer including a molybdenum layer, an aluminum layer and a molybdenum layer.

The first and second source electrodes 65a and 65b at least partially overlap the semiconductor layers 40a and 40b, respectively. The first and second drain electrodes 66a and 66b respectively correspond to the first and second source electrodes 65a and 65b and are respectively disposed above the gate electrodes 26a and 26b. The first and second drain electrodes 66a and 66b at least partially overlap the semiconductor layers 40a and 40b, respectively. The ohmic contact layer 55a is interposed between the semiconductor layer 40a and the first source electrode 65a and between the semiconductor layer 40a and the first drain electrode 66a and thereby reduces a contact resistance between the semiconductor layer 40a and the first source electrode 65a and between the semiconductor layer 40a and the first drain electrode 66a. Likewise, the ohmic contact layer 56a is interposed between the semiconductor layer 40b and the second source electrode 65b and between the semiconductor layer 40b and the second drain electrode 66b and thereby reduces a contact resistance between the semiconductor layer 40b and the second source electrode 65b and between the semiconductor layer 40b and the second drain electrode 66b.

A passivation layer 70 is formed on the data interconnections 62a, 62b, 65a, 65b, 66a and 66b and on portions of the semiconductor layers 40a and 40b exposed between the first source electrode 65a and the first drain electrode 66a and between the second source electrode 65b and the second drain electrode 66b. In exemplary embodiments, the passivation layer 70 may be formed of a silicon nitride- or silicon oxide-based inorganic material, a photosensitive organic material with excellent planarization properties, or a low-k dielectric material such as a-Si:C:O or a-Si:O:F which can be formed using a plasma enhanced chemical vapor deposition ("PECVD"). In exemplary embodiments, the passivation layer 70 may include a double-layer structure consisting of a lower inorganic layer and an upper organic layer so as to provide excellent properties of organic layers and to effectively protect the exposed portions of the semiconductor layers 40a and 40b. A red, green, or blue color filter layer may be used as the passivation layer 70, in exemplary embodiments.

First and second sub-pixel electrodes 82a and 82b are formed on the passivation layer 70. The first and second sub-pixel electrodes 82a and 82b are respectively electrically connected to the first and second drain electrodes 66a and 66b via first and second contact holes 76a and 76b. In exemplary embodiments, the first and second sub-pixel electrodes 82a and 82b may be formed of a transparent conductive material such as ITO or IZO or may be formed of a reflective conductive material such as aluminum.

The first and second sub-pixel electrodes 82a and 82b are respectively physically/electrically connected to the first and second drain electrodes 66a and 66b via the first and second contact holes 76a and 76b and are thus are each provided with different data voltages by the first and second drain electrodes 66a and 66b, respectively.

The first and second sub-pixel electrodes 82a and 82b generate an electric field together with a common electrode of an upper display panel upon being provided with different data voltages by the first and second drain electrodes 66a and 66b, respectively. As a result, an arrangement of liquid crystal molecules between the first and second sub-pixel electrodes 82a and 82b and the common electrode is controlled.

Referring to FIGS. 2 and 3A, the first sub-pixel electrode 82a and the common electrode may constitute the liquid crystal capacitor $C_{lca}$, and the second sub-pixel electrode 82b and the common electrode may constitute the liquid crystal capacitor $C_{lcb}$. The liquid crystal capacitors $C_{lca}$ and $C_{lcb}$ can uniformly maintain their voltages even after the TFTs $Q_a$ and $Q_a$ are turned off. In exemplary embodiments, in order to enhance the voltage sustain capabilities of the liquid crystal capacitors $C_{lca}$ and $C_{lcb}$, the storage capacitors $C_{sta}$ and $C_{stb}$, which are respectively connected in parallel to the liquid crystal capacitors $C_{lca}$ and $C_{lcb}$, may be formed by laying the first and second drain electrodes 66a and 66b over the storage interconnections 27 and 28.

Referring to FIGS. 3A through 3C, the pixel electrode 82 includes the first and second sub-pixel electrodes 82a and 82b which conform to each other's shape and are electrically separated by a gap 83. In exemplary embodiments, the first sub-pixel electrode 82a may be V-shaped, and the second sub-pixel electrode 82b is formed in portions of a pixel where the first sub-pixel electrode 82a is not formed. In an exemplary embodiment, the second sub-pixel electrode 82b surrounds the first sub-pixel electrode 82a.

The gap 83 includes a plurality of slanted portions 83a which form an angle of about 45 degrees with respect to the gate line 22 and a plurality of vertical portions 83b which connect the slanted portions 83a and extend along the first and second data lines 62a and 62b.

A plurality of first domain-dividing elements 84 may be formed in the second sub-pixel electrode 82b. The plurality of first domain-dividing elements 84 form an angle of about 45 degrees with respect to the gate line 22. In exemplary embodiments, the plurality of first domain-dividing elements 84 may be cutouts or protrusions. A display region of the pixel electrode 82 may be divided into a plurality of domains according to an orientation in which the liquid crystal molecules in a liquid crystal layer are aligned when an electric field is applied to the liquid crystal layer. The gap 83 and the plurality of first domain-dividing elements 84 divide the pixel electrode 82 into a number of domains. A domain is an area defined by a group of liquid crystal molecules whose liquid crystal molecules are uniformly tilted in the same direction due to an electric field formed between the pixel electrode 82 and a common electrode 90 of FIG. 4. In exemplary embodiments, the first sub-pixel electrode 92a may also include one or more domain-dividing elements.

In exemplary embodiments, the slanted portions 83a of the gap 83 and the plurality of first domain-dividing elements 84 may include notches 85 which prevent or substantially reduce smudges or afterimages.

The first sub-pixel electrode 82a is V-shaped, and the second sub-pixel electrode 82b surrounds the first sub-pixel electrode 82a. More specifically, the second sub-pixel electrode 82b is divided into main areas which are adjacent to the slanted portions 83a of the gap 83, form an angle of about 45 degrees with respect to the gate line 22 and control the movement of liquid crystal molecules. Bridge areas which are adjacent to the vertical portions 83b of the gap 83, extend along the first and second data lines 62a and 62b, and connect the main areas of the second sub-pixel electrode 82b.

Referring to FIG. 3A, the first and second data lines 62a and 62b are at least partially overlapped by the second sub-pixel electrode 82b. In an exemplary embodiment, the first and second data lines 62a and 62b are completely overlapped 72b in a width direction by the second sub-pixel electrode 82b. More specifically, the first and second data lines 62a and 62b are overlapped by the bridge areas of the second sub-pixel electrode 82b. In short, since the first and second data lines 62a and 62b are overlapped by the second sub-pixel electrode 82b, instead of being overlapped by the first sub-pixel electrode 82a, it is possible to reduce the coupling capacitances between the first sub-pixel electrode 82a and the first data line 62a and between the first sub-pixel electrode 82a and the second data line 62b and thereby enhances the display characteristics of an LCD device.

In the case of driving an LCD device, including the first and second data lines 62a and 62b which are overlapped by the second sub-pixel electrode 82b, at a low grayscale level, light leakage can be prevented or substantially reduced from occurring near the first and second data lines 62a and 62b since the second sub-pixel electrode 82b blocks light. However, light leakage may occur in the vicinity of the ends of the plurality of first domain-dividing elements 84 depending on a viewing angle and a degree to which the first and second data lines 62a and 62b are overlapped by the second sub-pixel electrode 82b. For example, light leakage is likely to occur in the vicinity of the ends of the plurality of first domain-dividing elements 84 since the width of the second sub-pixel electrode 82b is relatively small near the ends of the plurality of first domain-dividing elements 84.

Referring to FIGS. 3A and 3C, in an exemplary embodiment, in order to prevent or substantially reduce light leakage from occurring near the ends of the plurality of first domain-dividing elements 84, a width W1 of a portion of the second sub-pixel electrode 82b in the vicinity of the ends of the plurality of first domain-dividing elements 84 may be larger than a width W2 of the bridge areas of the second sub-pixel electrode 82b which are adjacent to the vertical portions 83b of the gap 83. In further exemplary embodiments, a length of the plurality of first domain-dividing elements 84 may be reduced such that a horizontal separation distance L1 between the second data line 62b and the end of each of the plurality of first domain-dividing elements 84 may become larger than a horizontal separation distance L2 between the second data line 62b and each of the vertical portions 83b of the gap 83. Here, the term "horizontal separation distance" denotes the separation distance between the objects on a layout. The horizontal separation distance L1 may be about 2 μm or more larger than the horizontal separation distance L2. In an exemplary embodiment, if the horizontal separation distance L2 is about 1 μm, the horizontal separation distance L1 may be about 3 μm or larger.

In an exemplary embodiment, an alignment layer (not shown), which aligns liquid crystal molecules, may be formed on the first and second sub-pixel electrodes 82a and 82b and on the passivation layer 70.

Figure 4:
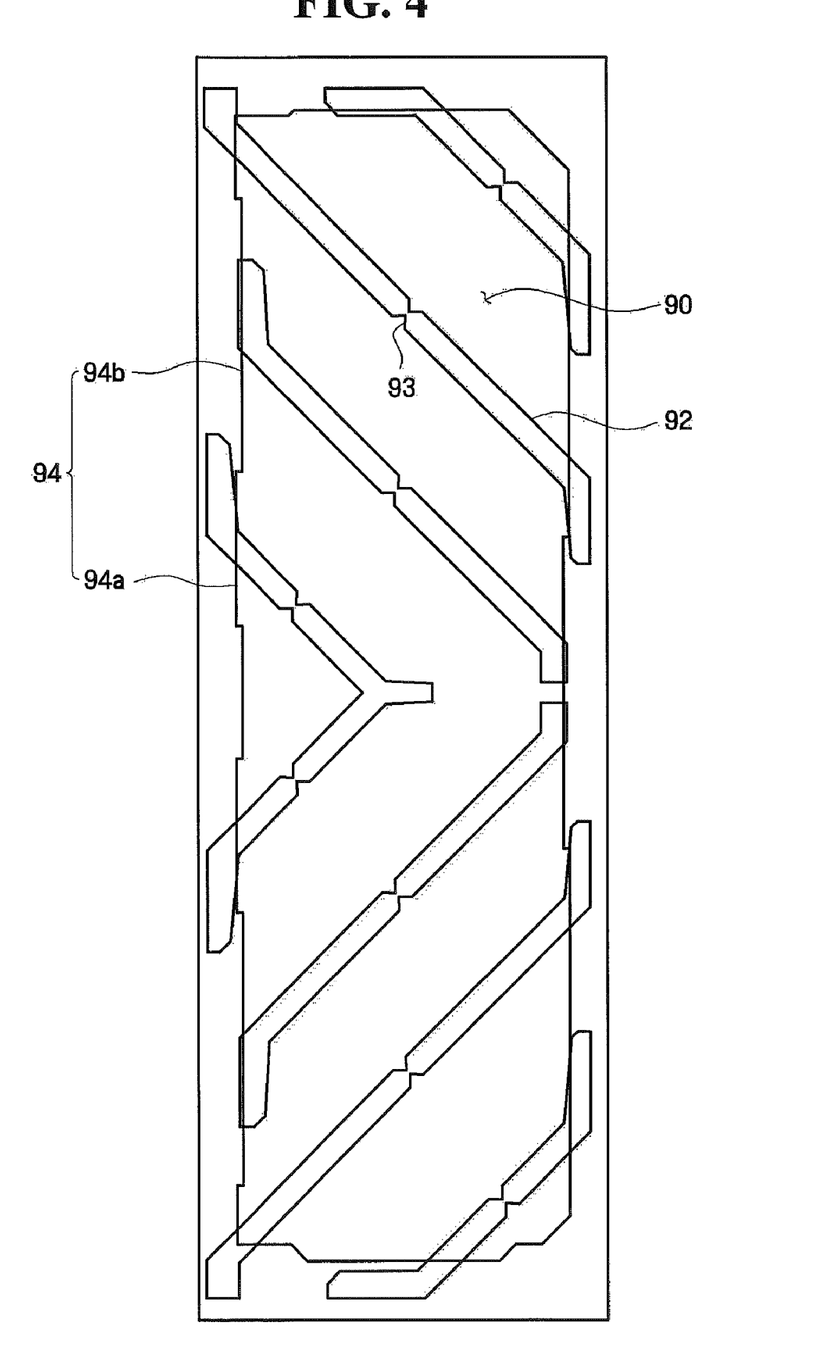
FIG. 4 illustrates a top plan layout view of an exemplary embodiment of an upper display panel which can be coupled to the exemplary lower display panel illustrated in FIG. 3A.
Figure 5:
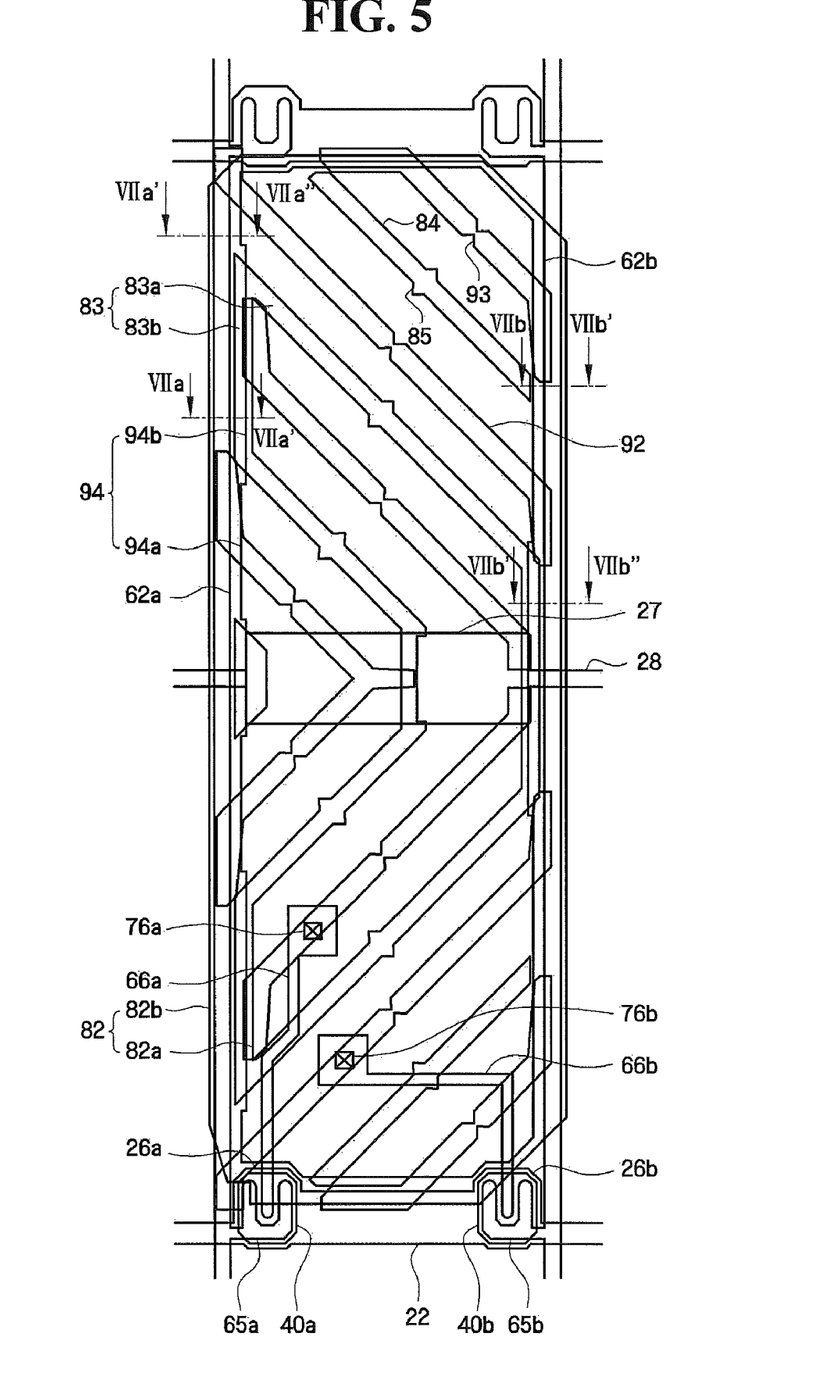
FIG. 5 illustrates a top plan layout view of an exemplary embodiment of an LCD device including the exemplary lower display panel illustrated in FIG. 3A and the exemplary upper display panel illustrated in FIG. 4.
Figure 6:
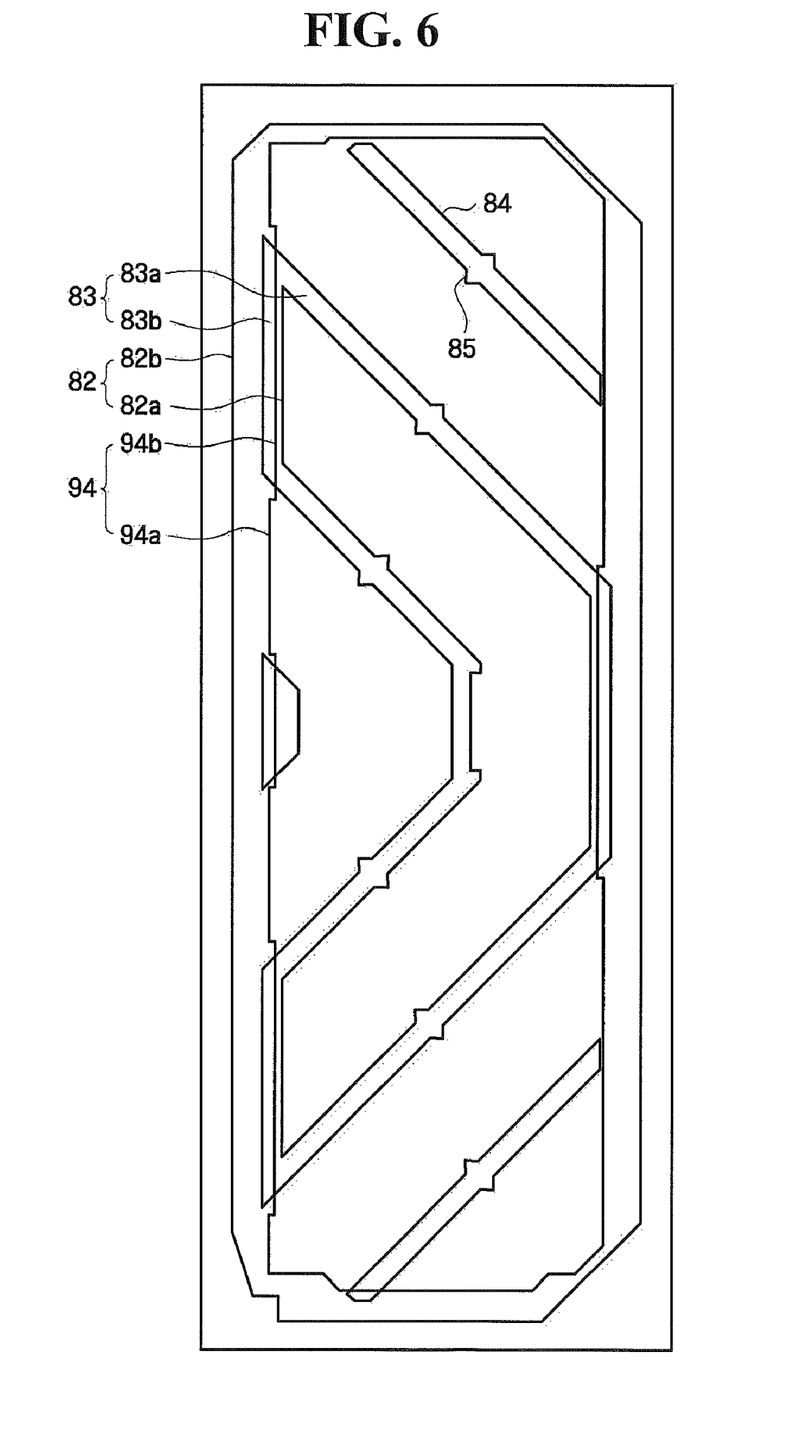
FIG. 6 illustrates a top plan layout view of an exemplary pixel electrode and a black matrix illustrated in FIG. 5.

The structures of an exemplary upper display panel and an exemplary LCD device will hereinafter be described in detail with reference to FIGS. 4 through 7B. FIG. 4 illustrates a top plan layout view of an exemplary upper display panel which can be coupled to the exemplary lower display panel illustrated in FIG. 3A, FIG. 5 illustrates a top plan layout view of an exemplary embodiment of an LCD device including the exemplary upper display panel illustrated in FIG. 3A, FIG. 6 illustrates a top plan layout view of an exemplary pixel electrode and a black matrix illustrated in FIG. 5, FIG. 7A illustrates a cross-sectional schematic diagram view taken along line VIIa-VIIa' of FIG. 5 and a cross-sectional schematic diagram view taken along line VIIa'-VIIa" of FIG. 5 and FIG. 7B illustrates a cross-sectional schematic diagram view taken along line VIIb-VIIb' of FIG. 5 and a cross-sectional schematic diagram view taken along line VIIb'-VIIb" of FIG. 5.

Referring to FIGS. 4 through 7B, a black matrix 94 is formed on an insulation substrate 100 which is formed of, for example, transparent glass in an exemplary embodiment. The black matrix 94 prevents or substantially reduces light leakage and defines a pixel region. In an exemplary embodiment, the black matrix 94 may be formed in areas corresponding to the gate line 22, the first and second data lines 62a and 62b and TFTs. In further exemplary embodiments, the black matrix 94 may be formed in various shapes in order to effectively prevent or substantially reduce light leakage from occurring near the first and second sub-pixel electrodes and TFTs. In exemplary embodiments, the black matrix 94 may be formed of chromium or a chromium-based metallic material such as chromium oxide, or organic black resist.

Light leakage may occur in areas between the first sub-pixel electrode 82a and the first and second data lines 62a and 62b, e.g., near the vertical portions 83b of the gap 83. In order to prevent or substantially reduce such light leakage and to enhance an aperture ratio of an LCD device, the black matrix 94 may include an irregular shape and extend along the first and second data lines 62a and 62b. Referring to FIG. 6, the black matrix 94 includes a plurality of protruding portions 94b which are adjacent to the vertical portions 83b of the gap 83 and overlap the vertical portions 83b, and a plurality of recessed portions 94a which are not adjacent to the vertical portions 83b. An overlap area of the black matrix 94 and the pixel electrode 82 can be reduced due to the recessed portions 94a of the black matrix 94, and thereby, the aperture ratio of an LCD device can be enhanced. The protruding portions 94b of the black matrix 94 prevent or substantially reduce light leakage from occurring near the vertical portions 83b of the gap 83.

Figure 7A:
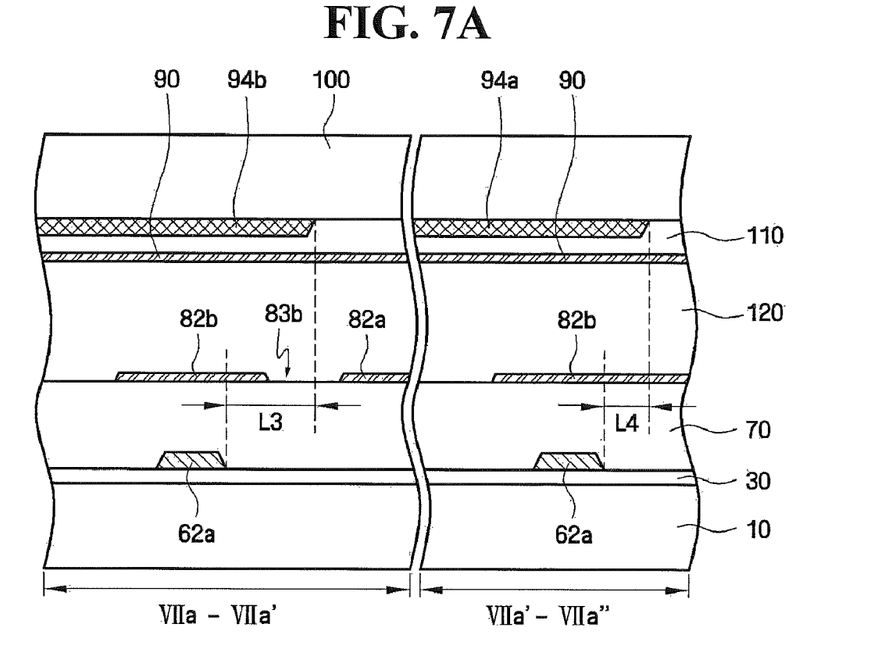
FIG. 7A illustrates a cross-sectional schematic diagram view taken along line VIIa-VIIa' of FIG. 5 and a cross-sectional schematic diagram view taken along line VIIa'-VIIa" of FIG. 5.
Figure 7B:
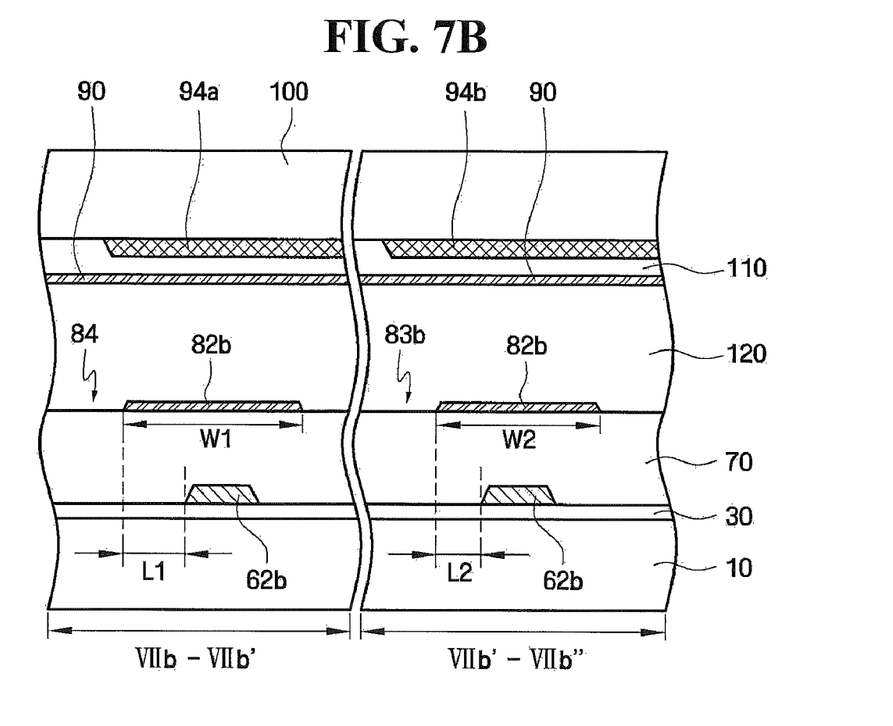
FIG. 7B illustrates a cross-sectional schematic diagram view taken along line VIIb-VIIb' of FIG. 5 and a cross-sectional schematic diagram view taken along line VIIb'-VIIb" of FIG. 5.

Referring to FIG. 7A, an end portion of a protruding portion 94b is located above a vertical portion 83b. In exemplary embodiments, a horizontal separation distance L3 between the end of the protruding portion 94a and the first data line 62a may be larger than a horizontal separation distance L4 between the end of a recessed portion 94a and the first data line 62a. In an exemplary embodiment, the horizontal separation distance L3 may be about 3 μm or more larger than the horizontal separation distance L4. In an exemplary embodiment, for example, if the horizontal separation distance L4 is about 3 μm, then the horizontal separation distance L3 may be about 6 μm. That is, the protruding portions 94b include a step difference of about 3 μm or more with the recessed portions 94a.

In exemplary embodiments, red, green and blue color filters (not shown) may be sequentially arranged in a pixel region within the black matrix 94.

In further exemplary embodiments, an overcoat layer 110 may be formed on the red, green and blue color filters in order to planarize a step difference(s) between the red, green and blue color filters.

In exemplary embodiments, a common electrode 90 is formed of a transparent conductive material such as ITO or IZO on the overcoat layer 110. The common electrode 90 includes a plurality of second domain-dividing elements 92 which form an angle of about 45 degrees with respect to the gate line 22. In exemplary embodiments, the plurality of second domain-dividing elements 92 may be cutouts or protrusions. In further exemplary embodiments, the plurality of second domain-dividing elements 92 may include one or more notches 93 which can prevent or substantially reduce smudges or afterimages.

In an exemplary embodiment, an alignment layer (not shown), which aligns liquid crystal molecules, may be formed on the common electrode 90.

A basic LCD structure according to an exemplary embodiment of the present invention may be obtained by aligning and then coupling the exemplary lower display panel illustrated in FIG. 3A and the exemplary upper display panel illustrated in FIG. 4 with a liquid crystal material inserted therebetween and vertically aligning the liquid crystal material.

The liquid crystal molecules in a liquid crystal layer 120 are initially aligned perpendicular to the lower display panel and the upper display panel until an electric field between the pixel electrode 82 and the common electrode 90 is applied to the liquid crystal layer 120. The liquid crystal molecules in the liquid crystal layer 120 include a negative dielectric anisotropy.

In addition to the above-described basic LCD structure, an exemplary LCD device may also include additional elements such as polarization plates and a backlight assembly. In an exemplary embodiment, the polarization plates may be arranged on opposite sides of the basic LCD structure such that a transmission axis of one of the polarization plates is in parallel with the gate line 22 and a transmission axis of the other polarization plate is perpendicular to the gate line 22.

When an electric field is applied between the lower display panel and the upper display panel, a vertical electric field is generated in most areas except those areas near the plurality of first and second domain-dividing elements 84 and 92, respectively, in which a horizontal electric field is generated. The horizontal electric field helps the alignment of liquid crystal molecules in each domain.

Since the liquid crystal molecules in the liquid crystal layer 120 include negative dielectric anisotropy, liquid crystal molecules in each domain tilt in a direction substantially perpendicular to the gap 83 or the plurality of first and second domain-dividing elements 84 and 92 when an electric field is applied to the liquid crystal layer 120. Therefore, groups of liquid crystal molecules on opposite sides of each of the gap 83 and the plurality of first and second domain-dividing elements 84 and 92, which define domains, tilt in opposite directions. Since the slanted portions 83a of the gap 83 or the first and second domain-dividing elements 84 and 92 are symmetrical with respect to a center or central portion of a pixel, the liquid crystal molecules in the liquid crystal layer 120 tilt in four directions by forming an angle of about 45 degrees with respect to the gate line 22. Since the liquid crystal molecules in the liquid crystal layer 120 can tilt in four directions, optical characteristics of the liquid crystal molecules can be appropriately compensated for, and a viewing angle of an LCD device can be thereby widened.

An exemplary embodiment of an operation of an LCD device according to the present invention will hereinafter be described in detail with reference to FIGS. 3A through 5.

Referring to FIGS. 3A through 5, a relatively high data voltage is applied to the first sub-pixel electrode 82a which is connected to the first data line 62a, and a relatively low data voltage is applied to the second sub-pixel electrode 82b which is connected to the second data line 62b. By doing so, it is possible to improve a lateral visibility of an LCD device.

In particular, in the case of driving an LCD device at a low grayscale level, liquid crystal molecules are driven only by the first sub-pixel electrode 82a to which a relatively high data voltage is applied, and no voltage is applied to the second sub-pixel electrode 82b. In this case, since the voltage applied to the second sub-pixel electrode 82b is substantially the same as the voltage applied to the common electrode 90, liquid crystal molecules disposed over the second sub-pixel electrode 82b are aligned such that the liquid crystal molecules become perpendicular to the lower display panel. Accordingly, light emitted from a backlight assembly can be prevented or substantially reduced from transmitting through the second sub-pixel electrode 82b.

In the case of driving an LCD device at a high grayscale level, the problem of light leakage may not be serious since the luminance of the LCD device is generally high. Therefore, it is very important to prevent light leakage when an LCD device is driven at a low grayscale level. In general, light leakage is highly likely to occur near the first and second data lines 62a and 62b. In the exemplary embodiment of FIGS. 3A through 7B, the second sub-pixel electrode 82b is laid over the first and second data lines 62a and 62b, respectively, and then an LCD device is driven at a low grayscale level. In this case, light can be blocked by the second sub-pixel electrode 82b, and thus, light leakage can be prevented or substantially reduced from occurring near the first and second data lines 62a and 62b, respectively. In addition, according to the exemplary embodiment of FIGS. 3A through 7B, light leakage can be prevented or substantially reduced simply using the second sub-pixel electrode 82b, which surrounds the first sub-pixel electrode 82a, without the need to increase an area of the black matrix 94 of the upper display panel. Thus, it is possible to increase the aperture ratio of an LCD device.

The first sub-pixel electrode 82a to which a relatively high voltage is applied may deteriorate the display characteristics of an LCD device when the coupling capacitance between the first sub-pixel electrode 82a and the first data line 62a and the coupling capacitance between the first sub-pixel electrode 82a and the second data line 62b are different. Thus, in order to address this issue, the first sub-pixel electrode 82a may be arranged not to overlap the first and second data lines 62a and 62b. Therefore, it is possible to reduce the coupling capacitances between the first sub-pixel electrode 82a and the first data line 62a and between the first sub-pixel electrode 82a and the second data line 62b and thereby to prevent the display characteristics of an LCD device from being adversely affected by the coupling capacitances between the first sub-pixel electrode 82a and the first data line 62a and between the first sub-pixel electrode 82a and the second data line 62b.

Figure 8:
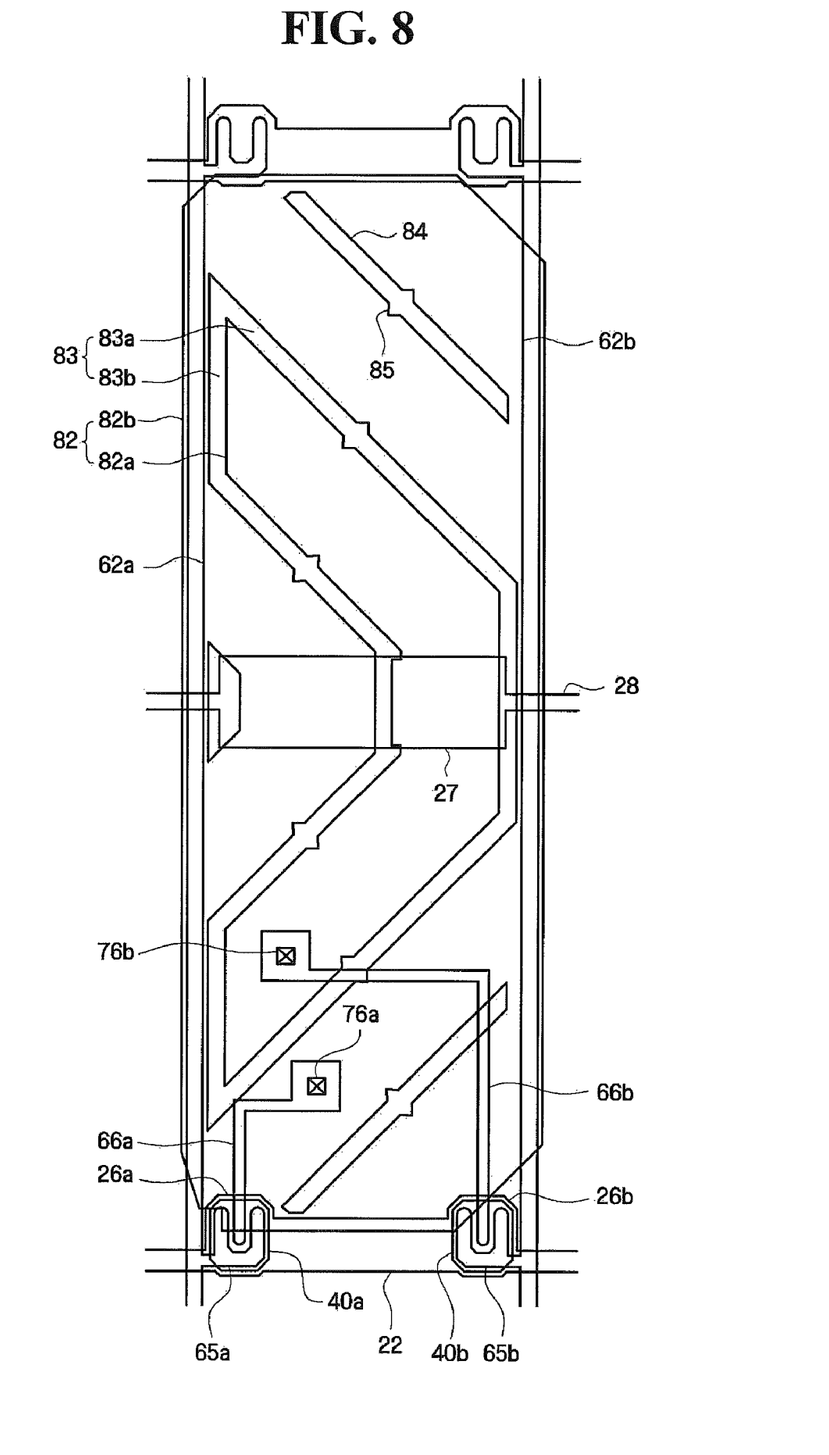
FIG. 8 illustrates a top plan layout view of an exemplary embodiment of a lower display panel including a B-type pixel of FIG. 1 according to another exemplary embodiment of the present invention.

The structure of a lower display panel of an LCD device according to another exemplary embodiment of the present invention will hereinafter be described in detail with reference to FIG. 8. FIG. 8 illustrates a top plan layout view of an exemplary lower display panel including a B-type pixel of FIG. 1. For convenience, like reference numerals in FIGS. 3A through 8 represent like elements, and thus, detailed descriptions thereof will be omitted. The exemplary embodiment of FIG. 8 will hereinafter be described, focusing mainly on differences with the exemplary embodiment of FIGS. 3A through 7B.

Referring to FIG. 8, a first drain electrode 66a is connected to a second sub-pixel electrode 82b via a first contact hole 76a, and a second drain electrode 66b is connected to a first sub-pixel electrode 82a via a second contact hole 76b. The first sub-pixel electrode 82a is connected to a second data line 62b, and a relatively high data voltage is applied to the first sub-pixel electrode 82a via the second data line 62b. The second sub-pixel electrode 82b is connected to a first data line 62a, and a relatively low data voltage is applied to the second sub-pixel electrode 82b via the first data line 62a. In this manner, it is possible to enhance the lateral visibility of an LCD device.

In the exemplary embodiment of FIG. 8, similar to the exemplary embodiment of FIGS. 3A through 7B, light leakage can be prevented or substantially reduced from occurring near the first and second data lines 62a and 62b, and the aperture ratio of an LCD device can be increased. In addition, it is possible to prevent or substantially reduce a deterioration of the display characteristics of an LCD device by reducing the coupling capacitances between the first sub-pixel electrode 82a and the first data line 62a and between the first sub-pixel electrode 82a and the second data line 62b.

As described above, according to the present invention, it is possible to prevent light leakage from occurring near data lines and to increase the aperture ratio of an LCD device. In addition, it is possible to prevent deterioration of the display characteristics of an LCD device by reducing the coupling capacitances between a first sub-pixel electrode and a first data line and between the first sub-pixel electrode and a second data line.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display device comprising:
   a first insulation substrate;
   a gate line which is disposed on the first insulation substrate and extends substantially in a first direction;
   first and second data lines which are insulated from the gate line, extend substantially in a second direction and intersect the gate line;
   a pixel electrode which comprises first and second sub-pixel electrodes which are each provided with different data voltages via the first and second data lines, respectively, and which are separated from each other by a gap, the second sub-pixel electrode at least partially overlapping the first and second data lines;
   a second insulation substrate which faces the first insulation substrate;
   a black matrix which is disposed on the second insulation substrate, includes at least one protruding portion and at least one recessed portion and extends substantially along the first and second data lines; and
   a liquid crystal layer which is interposed between the first and second insulation substrates.

2. The liquid crystal display device of claim 1, wherein a larger data voltage is applied to the first sub-pixel electrode than to the second sub-pixel electrode.

3. The liquid crystal display device of claim 1, wherein the first and second data lines are completely overlapped in a width direction with the second sub-pixel electrode in the second sub-pixel electrode.

4. The liquid crystal display device of claim 3, wherein the first and second data lines are not overlapped by the first sub-pixel electrode.

5. The liquid crystal display device of claim 1, wherein the second sub-pixel electrode surrounds the first sub-pixel electrode.

6. The liquid crystal display device of claim 1, wherein the first sub-pixel electrode is V-shaped, and the second sub-pixel electrode is formed in portions of a pixel where the first sub-pixel electrode is not formed.

7. The liquid crystal display device of claim 6, wherein the second sub-pixel electrode comprises one or more main areas which form an angle of about 45 degrees with respect to the gate line and at least one bridge area which extends substantially along the first and second data lines and connects the main areas, and the first and second data lines overlap the bridge area.

8. The liquid crystal display device of claim 1, wherein the protruding portions are disposed adjacent to the gap and overlap the gap and the recessed portions are separated from the gap.

9. The liquid crystal display device of claim 8, wherein the gap comprises at least one slanted portion which forms an inclination angle with respect to the gate line and at least one vertical portion which connects the slanted portion and extends substantially along the first and second data lines, and the protruding portion overlaps the vertical portion.

10. The liquid crystal display device of claim 8, wherein the protruding portions include a step difference of about 3 μm or larger with the recessed portions.

11. The liquid crystal display device of claim 10, wherein a first horizontal separation distance between the first or second data line and an end of each of the protruding portions is larger than a second horizontal separation distance between the first or second data line and an end of each of the recessed portions.

12. The liquid crystal display device of claim 11, wherein the first horizontal separation distance is about 3 μm or larger than the second horizontal separation distance.

13. The liquid crystal display device of claim 12, wherein the first horizontal separation distance is about 6 μm or larger.

14. The liquid crystal display device of claim 1, wherein the second sub-pixel electrode comprises at least one first domain-dividing element which divides the pixel electrode into a plurality of domains, the gap comprises at least one slanted portion which forms an inclination angle with respect to the gate line and at least one vertical portion which connects the slanted portion and extends substantially along the first and second data lines, and a width of the second sub-pixel electrode is larger in the vicinity of one ends of each of the first domain-dividing elements than in the vicinity of the vertical portions of the gap.

15. The liquid crystal display device of claim 14, wherein a first horizontal separation distance between the first or second data line and an end of each of the first domain-dividing elements is larger than a second horizontal separation distance between the first or second data line and each of the vertical portions.

16. The liquid crystal display device of claim 15, wherein the first horizontal separation distance is about 2 μm or larger than the second horizontal separation distance.

17. The liquid crystal display device of claim 16, wherein the first horizontal separation distance is about 3 μm or larger.

18. The liquid crystal display device of claim 1, wherein a first-type pixel and a second-type pixel which are alternately arranged, the first-type pixel comprising the first sub-pixel electrode to which a data voltage is applied via the first data line, and the second second-type pixel comprising the first sub-pixel electrode to which a data voltage is applied via the second data line.

19. The liquid crystal display device of claim 1, wherein the liquid crystal layer comprises liquid crystal molecules with negative dielectric anisotropy.

20. The liquid crystal display device of claim 1, further comprising a common electrode which is disposed on the second insulation substrate, comprises at least one second domain-diving elements.

* * * * *